Patented Aug. 1, 1939

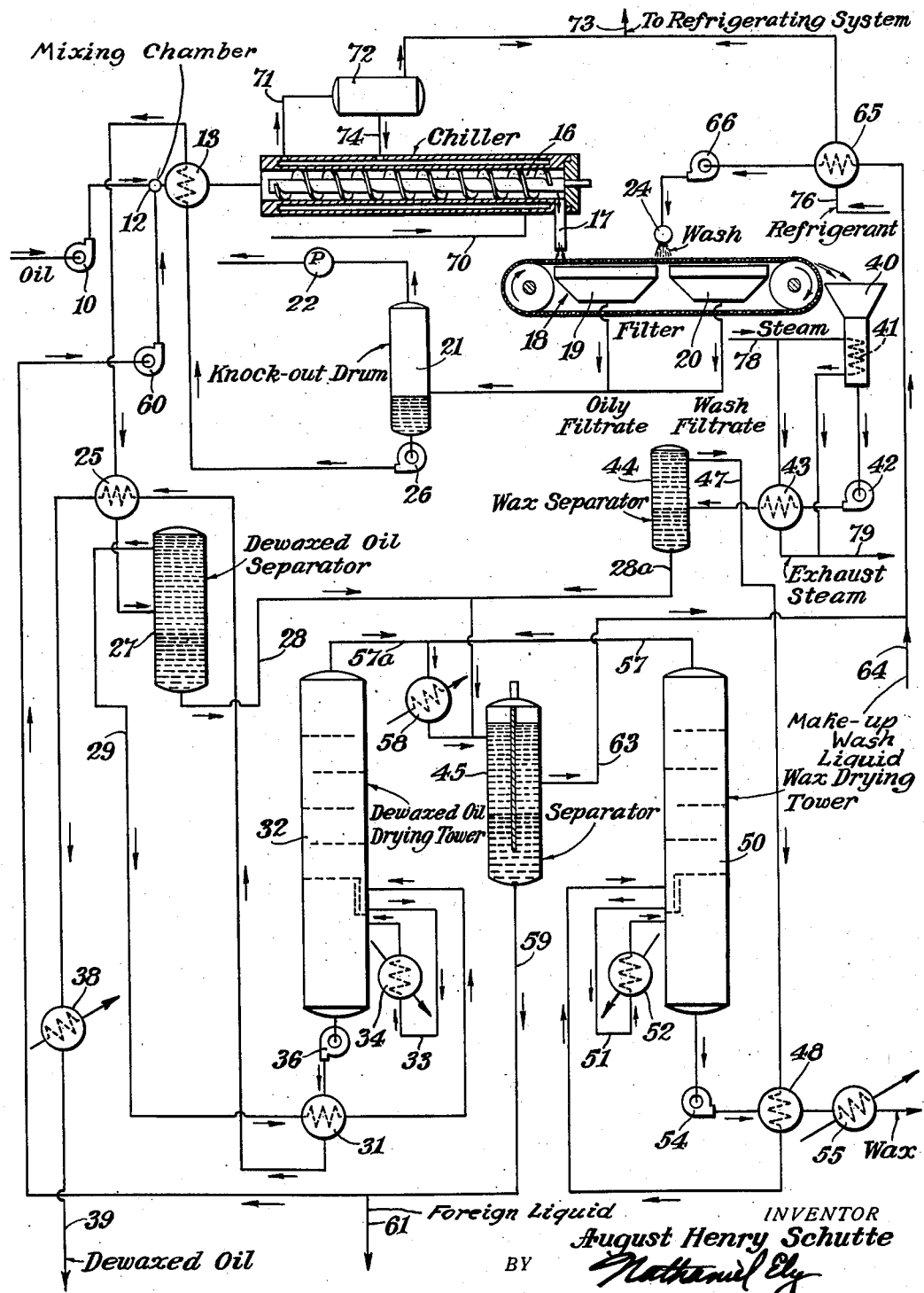

2,168,140

UNITED STATES PATENT OFFICE 2,168,140

OIL DEWAXING

August Henry Schutte, Westfield, N. J.

Application February 25, 1938, Serial No. 192,534

10 Claims. (Cl. 196—18)

This invention relates to improvements in the art of dewaxing petroleum oils to reduce the cold test thereof.

One of the principal objects of this invention is to materially simplify the removal of wax from oils, particularly petroleum lubricating oils, and to expedite the continuous recovery of wax free oil.

Another object of this invention is to provide a more complete wax removal process for removing wax from petroleum oils by the steps of chilling an emulsion of the oil and a foreign liquid having a freezing point above the temperature of solidification of the oil to afford a separation of wax free oil by the agglomeration of the wax which is aided by the crystal formation of the foreign liquid.

A more specific object of this invention is to provide an improved process for the removal of wax from lubricating oils by forming a water emulsion of the oil which is chilled so that the crystals formed, modify the wax and facilitate the removal of the oil therefrom.

Another object of the invention is to mix a crystallizable mass with wax containing oils, and crystallizing said mass to serve as a filter aid for separating out the oil, and then subsequently separating the crystallized mass from the wax.

Further objects and advantages of this invention will appear from the following description of a preferred form of embodiment thereof taken in connection with the attached drawing which is a diagrammatic illustration of a flow diagram for the separation of wax from petroleum oils.

The invention is based upon the freezing of an emulsion of wax containing lubricating oil with a foreign liquid which is substantially insoluble in the oil, has a freezing point above the congealing point of the dewaxed oil, a low viscosity near the freezing point, and one which crystallizes sharply. While I do not want to be limited to any precise theory of action, it appears that when crystallization of this foreign liquid takes place, the crystals facilitate the crystallization of the wax as well as serve as an aid to filtration. A larger portion of the wax than will ordinarily separate out becomes a substantially oil free precipitate, thus giving a freer and more complete oil separation. Subsequently, the wax and foreign liquid may be separated from each other, the foreign liquid recycled, and the wax free oil, and oil free wax removed as end products. Diluents may be used to reduce viscosity, and the diluents may also be recycled. Extremely low temperatures are not necessary and there is a smaller temperature differential between pour point and dewaxing temperatures.

Suitable foreign liquids may be water, organic liquids, or inorganic liquids or even metal alloys which meet the above requirements of crystallization, substantial insolubility, and appropriate freezing points. Certain mercury alloys are available. Water is so inexpensive and satisfactory, however, that it will be considered as the foreign liquid in the following description of a preferred flow arrangement. Likewise, any suitable diluent may be used, but the relative economy to refiners in using naphtha is such that it may be considered most advantageous under ordinary circumstances.

The wax carrying oil, which is preferably diluted as with naphtha, is pumped at 10 into a suitable mixing chamber 12 where it is intimately mixed with the desired quantity of a foreign liquid as heretofore mentioned. Various forms of mixing devices, such as homogenizers, may be used to obtain an intimate mixture and such mixture is preferably in the nature of an emulsion. By emulsion it is meant that a suspension is formed sufficiently stable for the requirements of the present process. The mixture is then passed through a heat exchanger 13 for a substantial reduction in temperature, and the oil emulsion is then discharged into any desired form of continuous chiller 16. Thus there is created an emulsion possessing sufficient stability and having a large inter-facial surface area. The emulsion produced may be either an oil in water or a water in oil type dependent on the relative quantities of the materials present and the desired effect.

The chiller 16 is preferably provided with a continuous spiral and is maintained at a temperature below the freezing point of the foreign liquid and the wax, and thus causes a freezing of the foreign liquid which has the highest freezing point. This crystallization appears to accelerate and increase the formation of wax crystals with a resultant crystalline mass of wax and foreign liquid which is then discharged at 17. The oil is in a thin liquid form due to the diluent which has been added.

The quantity of foreign liquid added to the oil at 12 materially affects the nature of the discharge from the chiller 16. Two extreme conditions may be considered. Internal phase includes the addition of a proportion of foreign liquid approximately equal to the volume of wax expected to be removed from the oil. In such case, the discharge is a relatively thin slurry which requires care in filtration. If a much larger volume of foreign liquid is added, approximately equal in volume to the combined volume of oil and diluent, external phase separation takes place, and the discharge is of sherbet-like consistency, very readily filtered or separated. The extra refrigerating cost must be considered, however.

The oil is next separated from the crystalline mass. A continuous filter 18 of "Fourdrinier" type is found preferable with certain types of mixtures, especially of the external phase type as the crystalline nature of the frozen foreign liquid materially aids in separating out the oil from the filter cake. With the internal phase slurry, the "Fourdrinier" type filter is also fairly satisfactory, but other types of filter or separator may be used. Such filters or separators are conveniently provided with suction boxes 19 and 20, cooperating with the filter surface and the oil filtrate is drawn off. The free oil is conveniently drawn off in the first suction box section and further oil removed at later stages with the aid of a wash liquid such as naphtha, discharged over the filter surface as by nozzles 24. In the present arrangement, the oily filtrate as well as the wash filtrate are both drawn into knock-out drum 21 under vacuum from pump 22, and the diluted oil subsequently separated at 27. It will be apparent, however, that more than one wash may be used, and that the filtrate may be separately treated if desired.

The liquid in the bottom of the knock-out drum 21 is a combination of wax free oil and wash liquid and is pumped by pump 26 through the chiller 13 for heat exchange, and thence through the heater 25, and thence into the dewaxed oil separator 27, which is a form of decanting vessel. From this separator, the wash liquid is removed through the pipe 28 from the bottom and the substantially pure oil is removed from the top through the pipe 29 where it is discharged, through a heat exchanger 31 into a dewaxed oil drying tower 32. This tower conveniently has a reboiling circuit 33 including a heater 34 for a substantially complete elimination of the foreign liquid in the oil. The completely dewaxed oil as a principal end product is discharged by the pump 36 through heat exchanger 31, heat exchanger 25 and, if desired, additional heat exchanger 38, into storage or further treatment at 39.

The filter cake from the filter 18 is the crystalline mass of wax and foreign liquid and is discharged into the hopper 40 which is provided with a suitable heating coil 41 to liquefy the mixture. This is then discharged under pressure by pump 42 and under increased temperature, brought about by heater 43, into the wax separator 44 which is also a type of decanting vessel. The foreign liquid is drawn off at the bottom through the pipe 28a where it joins with the wash liquid from the dewaxed oil separator 27 for entry into the separator vessel 45. The wax is removed from the top of the wax separator through the pipe 47, and then passes through the heat exchanger 48 and enters the wax drying tower 50 which is also provided with a reboiler circuit 51, including the heater 52. In this tower, the foreign liquid is substantially completely separated from the wax. The wax is discharged by the pump 54 through heat exchanger 48 and cooler 55 to storage or further processing.

The foreign liquid from the wax drying tower 50 and the foreign liquid from the dewaxed oil drying tower 32 are joined by the pipes 57 and 57a and passed through the condenser 58 and joined with the discharge of pipes 28 and 28a for entry into the separator 45. The bottom discharge at 59 from the separator 45 is principally the foreign liquid which is carried back into the original mixing chamber 12 by the pump 60. A draw-off or make-up line is provided at 61 to maintain the desired balance.

The wash liquid which is an oil diluent, and may suitably be naphtha, is removed from the separator 45 through the pipe 63 and may be supplemented by make-up wash liquid at 64, all of which is cooled in cooler 65 and is pumped at 66 into the wash nozzle 24. As has heretofore been described, the wash liquid is carried with the oil into the separator 27 and passes overhead from the dewaxed oil drying tower 32 with the volatile foreign liquid into the separator 45. A complete separation need not be made in separator 45 as the presence of diluent in the cold oil mixture from the mixing chamber 12 on is almost essential to prevent too high viscosity when the oil is chilled.

A suitable refrigerant is conducted into the chiller 16 by the pipe 70, from which it is normally discharged in counterflow through the pipe 71 into a reservoir 72 with the vaporized refrigerant returning to the refrigerating system at 73. Liquid refrigerant returns from the reservoir 72 to the chiller 70 through the pipe 74. Similar refrigerant enters the cooler 65 through the pipe 76 for adequately cooling the wash liquid and the refrigerant vapor also returns to the refrigerating system through the pipe 73. Steam enters coil 41 from a suitable source 78, and also passes through heater 43, exhausting at 79.

It will be apparent that the end products are completely separated with the dewaxed oil being free of all contaminating materials and the wax similarly purified by removal of the oil and diluent. The intermediate materials, including the foreign liquid, the wash liquid and the diluent are recycled through the system. In addition to, or in substitution for the suitable oil diluent which is desirable to prevent excessively high viscosity of the oil during chilling, it is entirely practicable to add oil solvents well known in the art, such as benzol or others, and in such case, even more effective wax separation can be accomplished. No change in the separating equipment would be necessary.

Economy in heating and refrigeration is accomplished by the use of heat exchangers wherever possible. If external phase treatment is used, the amount of excess refrigeration may be found burdensome, but this can be reduced to a minimum by recycling a large part of the filter cake and only removing a proportion in the wax recovery part of the system. If the part transferred to the wax recovery system is equal to the proportion of wax in the oil, the full amount of wax will be recovered and the refrigerant loss will be relatively low. In fact, the repulping of the feed to the chiller with this filter cake discharge will also facilitate wax removal and increase the yield.

While I have shown a preferred form of embodiment of my invention, I am aware that modifications may be made thereto and I therefore desire a broad interpretation of my invention within the scope and spirit of the disclosure herein, and of the claims appended hereinafter.

I claim:

1. The process of dewaxing a wax-bearing mineral lubricating oil which comprises emulsifying the oil with a diluent and an immiscible liquid having a crystal formation when frozen, chilling the mixture to such a low temperature as to precipitate the wax and freeze the immiscible liquid, filtering the oil from the precipitate with the precipitate acting as a filter aid, washing the precipitate with an oil diluent, separating the oil from the diluent, and separating the immiscible liquid and diluent from the wax.

2. The process of removing wax from lubricating oils which comprises mixing with said lubricating oil a quantity of water, emulsifying the mixture, chilling the emulsion to cause both the water and the wax to solidify and separating the oil from the solids.

3. The process of removing wax from lubricating oils which comprises diluting the lubricating oil, mixing with said oil a quantity of water substantially equal in volume to the volume of oil and diluent, to form an emulsion, chilling the emulsion to cause both the water and the wax to solidify and filtering the oil from the solids.

4. A process of dewaxing wax-containing lubricating oils which comprises mixing the lubricating oil stock with a foreign liquid mixture having a freezing point higher than the congealing point of the dewaxed oil, emulsifying the mixture, chilling said mixture to a temperature sufficient to crystallize the wax and the foreign liquid mixture, but insufficient to congeal the lubricating oil and filtering the oil from the mixture in the presence of an oil diluent and leaving a filter cake, subsequently heating the filter cake, separating the wax from the foreign liquid mixture and recycling the foreign liquid mixture and diluent.

5. The process of lowering the cold test of lubricating oils which comprises mixing water with said oil in amounts approximately equal to the amount of wax therein, emulsifying said mixture, chilling said mixture at a temperature sufficient to crystallize the water but insufficient to congeal the oil, separating the crystalline material by removal of the lubricating oil, and subsequently separating the wax from the water.

6. The process of lowering the cold test of lubricating oils which comprises mixing water with said oil, emulsifying said mixture, chilling said mixture at a temperature sufficient to crystallize the water and wax but insufficient to congeal the oil, separating the lubricating oil as a wax-free end product from the crystalline material, separating the wax as an oil-free end product from the water, and recycling the water.

7. The method of dewaxing lubricating oil which comprises the steps of emulsifying the lubricating oil with a substantially immiscible foreign liquid having a freezing point substantially higher than the congealing point of the dewaxed oil, lowering the temperature of the emulsion to crystallize the wax and foreign liquid, filtering the emulsion and removing the crystalline structure as a filter cake, heating the discharged filter cake, decanting the wax from the foreign liquid, fractionally distilling the wax to drive off the remaining foreign liquid and removing the wax as an end product, treating the filtrate to separate the foreign liquid from the oil, removing the dewaxed oil as an end product, and recycling the foreign liquid.

8. The method of dewaxing wax containing lubricating oils which comprises the steps of adding a diluent to the oil to be treated, emulsifying the wax-containing lubricating oils and a foreign liquid having a freezing point higher than the temperature of the congealing point of the dewaxed oil and immiscible in the wax or oil chilling said emulsion and forming a crystalline mixture of wax and the foreign liquid, subsequently filtering the oil from said crystalline structure, heating said crystalline structure and separating the immiscible liquid from the oil free wax.

9. The method of dewaxing wax containing lubricating oils which comprises the steps of adding a diluent to the oil to be treated, emulsifying the wax-containing lubricating oils and a foreign liquid having a freezing point higher than the temperature of the congealing point of the dewaxed oil and immiscible in the wax or oil chilling said emulsion and forming a crystalline mixture of wax and the foreign liquid, subsequently filtering the oil from said crystalline structure, heating said crystalline structure, separating the immiscible liquid from the oil free wax and separately distilling the oil and wax to re-remove the diluent.

10. The process of dewaxing a wax-bearing mineral oil which comprises mixing the oil with a diluent to reduce the viscosity thereof, emulsifying said mixture with a substantially immiscible liquid having a crystal formation when frozen and a freezing point higher than the subsequent chilling temperature required to obtain the desired dewaxing effect, chilling the emulsion so formed to such a temperature as to precipitate the wax and crystallize the immiscible liquid, filtering the oil from the precipitate, washing the precipitate with an oil diluent, separating the oil from the diluent, and separating the immiscible liquid and diluent from the wax.

AUGUST HENRY SCHUTTE.